(12) United States Patent
Hanson et al.

(10) Patent No.: US 6,192,400 B1
(45) Date of Patent: *Feb. 20, 2001

(54) MULTILEVEL DATA COMMUNICATION SYSTEM INCLUDING LOCAL AND HOST SYSTEMS

(75) Inventors: George E. Hanson; Arvin D. Danielson; Steven H. Salvay; Steven E. Koenck; Alan G. Bunte; Phillip Miller; Ronald L. Mahany; Guy J. West; Keith K. Cargin, all of Cedar Rapids, IA (US)

(73) Assignee: Intermec IP Corp., Woodland Hills, CA (US)

( * ) Notice: Under 35 U.S.C. 154(b), the term of this patent shall be extended for 0 days.

This patent is subject to a terminal disclaimer.

(21) Appl. No.: 09/148,962

(22) Filed: Sep. 8, 1998

Related U.S. Application Data

(63) Continuation of application No. 08/448,237, filed on May 23, 1995, now Pat. No. 5,805,807, which is a continuation of application No. 07/876,629, filed on Apr. 30, 1992, now abandoned, which is a continuation of application No. 07/854,115, filed on Mar. 18, 1992, now abandoned, which is a continuation-in-part of application No. 07/558,895, filed on Jul. 25, 1990, now abandoned, which is a continuation-in-part of application No. 07/529,353, filed on May 25, 1990, now abandoned.

(51) Int. Cl.⁷ ............................... G06F 15/16; H04B 7/00
(52) U.S. Cl. .................... 709/217; 709/227; 370/310; 235/472.01
(58) Field of Search .................................. 709/217, 227; 370/310; 235/472.01

(56) References Cited

U.S. PATENT DOCUMENTS

| | | | |
|---|---|---|---|
| 4,539,706 | * 9/1985 | Mears et al. | 455/11.1 |
| 4,775,928 | * 10/1988 | Kendall et al. | 713/310 |
| 4,789,983 | * 12/1988 | Acampora et al. | 370/349 |
| 4,803,487 | 2/1989 | Willard et al. . | |
| 4,850,009 | * 7/1989 | Zook et al. | 379/93.17 |
| 4,916,441 | * 4/1990 | Gombrich . | |
| 5,157,687 | * 10/1992 | Tymes | 375/206 |
| 6,006,100 | 12/1999 | Koenck et al. . | |

FOREIGN PATENT DOCUMENTS

| | | |
|---|---|---|
| WO 88/08649 | 11/1988 | (WO) . |
| WO 92/02084 | 2/1992 | (WO) . |

* cited by examiner

*Primary Examiner*—Krisna Lim
(74) *Attorney, Agent, or Firm*—Akin, Gump, Strauss, Hauer & Feld, L.L.P.

(57) ABSTRACT

A computerized system for managing freight or the like which is picked up at various points and delivered to other various destinations, and more particularly to such a system which utilizes hand-held terminals, scanners and printers which are linked together by a micro link radio to each other and by a wide area network radio link to a main area station which can receive and transmit information to a plurality of sets of terminals, printers and the like for managing an overall freight system.

13 Claims, 13 Drawing Sheets

MULTILEVEL DATA COMMUNICATION SYSTEM INCLUDING LOCAL AND HOST SYSTEMS

CROSS REFERENCE TO RELATED APPLICATIONS

Claiming Benefit Under 35 U.S.C. §120

This application is a continuation of application Ser. No. 08/448,237 filed May 23, 1995, now U.S. Pat. No. 5,805,807 issued Sep. 8, 1998, which is in turn a continuation of U.S. Ser. No. 07/876,629 by Danielson, et al., filed Apr. 30, 1992 (abandoned) which is a continuation of Ser. No. 07/854,115 filed Mar. 18, 1992, now abandoned, which is in turn a continuation-in-part of U.S. Ser. No. 07/558,895, filed Jul. 25, 1990 (abandoned), which is a continuation-in-part of Ser. No. 07,529,353 filed May 25, 1990 now abandoned.

TECHNICAL FIELD

The present invention relates generally to a computerized system for managing freight or the like which is picked up at various points and delivered to other various destinations, and more particularly to such a system which utilizes hand-held terminals, scanners and printers which are linked together by a micro link radio to each other and by a wide area network radio link to a main area station which can receive and transmit information to a plurality of sets of terminals, printers and the like for managing an overall freight system.

BACKGROUND ART

In the freight business, a common freight managing system will utilize a terminal which permits the keying in of information, a portable printer to which this device can be attached and a hand-held scanner which can be attached to the terminal. Consequently, when freight is received at a loading dock or by a driver who picks up freight, the critical information about the freight is entered into the terminal such as its size, weight, origin, and destination, etc. A bar code can be generated by the terminal and printer which then can be secured to the freight. A problem arises when the user is required to take the terminal and printer to the package of freight rather than when the freight itself is brought to the place where the terminal and printer is located. Especially for large or multiple packages of freight it is very difficult for the user to move the freight and the terminal/printer to where they need to be moved.

Similarly, in the delivery system, when packages are to be delivered it is often necessary to take the terminal, the printer and the scanner to the package or packages and then move not only the freight packages themselves but also these three components so that the bar code can be read by the scanner, entered into the terminal and the information printed out or read out on a display screen so the user can route it to the proper place or put it into a container destined for a certain location.

Consequently, there is a need for a computerized delivery system which eliminates the aforementioned problems.

DISCLOSURE OF THE INVENTION

The present invention relates generally to a computerized system for managing freight or the like which is picked up at various points and delivered to other various destinations, and more particularly to such a system which utilizes hand-held terminals, scanners and printers which are linked together by a micro link radio to each other and by a wide area network radio link to a main area station which can receive and transmit information to a plurality of sets of terminals, printers and the like for managing an overall freight system.

According to one aspect of the invention, a data system includes at least a data collection terminal device and a printer terminal device which data collection and printer terminal devices are communicatively coupled to each other by a low level, low power transmission link.

According to the invention and according to one particular feature thereof, data collection and processing devices, such as a data collection terminal including a keyboard and a display, a scanner, scales or linear measuring devices, and a printer may be communicatively coupled to interactively function as components of a common data entry system.

According to another particular feature of the invention, data collection and processing devices or components, such as a portable printer may be communicatively coupled by a low level, low power RF communication link to a data collection terminal to enter item identifiers and print shipping labels and invoices for items in shipping and transfer operations.

The low level communication links for such operations have been found to be particularly advantageous in simplifying shipping operations of articles packed in crates and packages which are relatively large and heavy in comparison to parcels which may readily picked up and carried about. Larger items, such as shipping crates, may need to be weighed and measured. Advantageously, the measurements and determined weights are then recorded on bar code labels which may readily be attached to the boxes or shipping crates. Shipping data are recorded at the local level by being communicated over the low power or low level communication link to a hand-held data collection terminal. The low level communication links minimize interference problems with other more remote systems to permit a great number of similar or identical systems to function simultaneously at sufficiently removed operating sites so as not to interfere with each other.

An object of the present invention is to provide an improved computerized system for managing the freight business.

Another object of the present invention is to provide an improved computerized freight system with a wireless link between a portable printer and a terminal whereby once the user has the printer nearby, the user does not need to carry the printer with him while entering and receiving data into an out from the terminal.

Another object of the present invention is to provide an improved computerized freight system which is compact so that it does not interfere with moving freight packages or moving from one freight package to another.

Still another object of the present invention is to provide an improved computerized freight system which provides a complete freight control system which is portable from truck to truck and does not need to be permanently installed therein.

A still further object of the present invention is to provide an improved computerized freight system which has backup communication systems in case the radio frequency wireless links fail or are temporarily inoperative.

Other objects, advantages, and novel features of the present invention will become apparent from the following detailed description of the invention when considered in conjunction with the accompanying drawings.

BEST MODES FOR CARRYING OUT THE INVENTION

Figure 1:
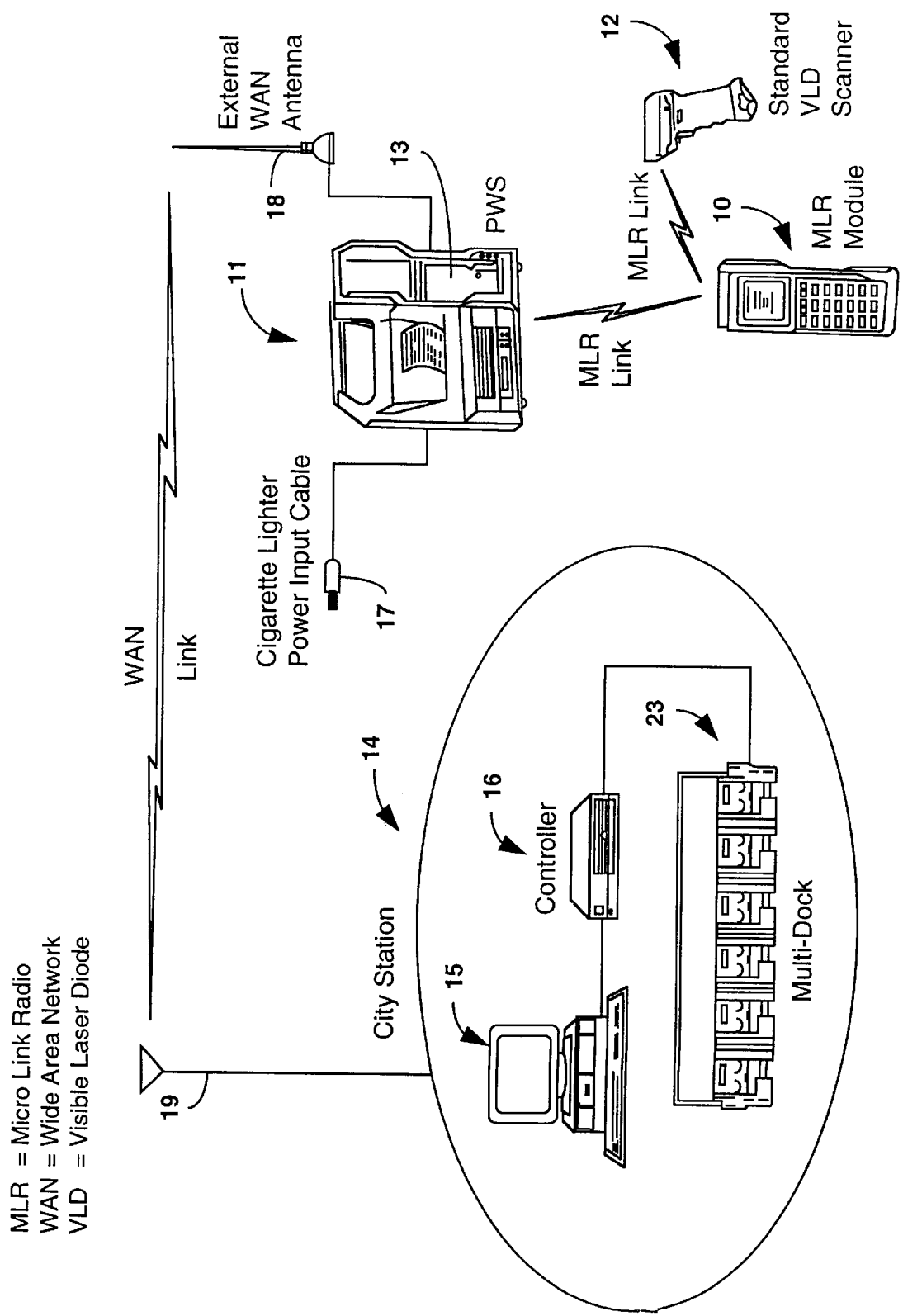
FIG. 1 is a schematic view of a preferred embodiment of a total computerized freight management system.

Referring now to the drawings wherein like reference numerals designate identical or corresponding parts throughout the several views, FIG. 1 shows a preferred embodiment of the present invention.

Freight companies have drivers which go to different places to pick up freight. Some of these companies specialize is very large boxes rather than the letter carrier types of freight. Since each driver has many tasks to do, such as weight boxes, move boxes, etc., the driver cannot feasible carry around a printer, terminal and a scanner all the time. Yet all of these devices are needed. Accordingly, each driver is provided with a terminal (10), a printer (11) and a scanner (12). The terminal (10) is essentially a small computer which has entry keys, a display and a system for docking into a printer (11) at dock (13), for example in the manner shown in U.S. Pat. No. 5,052,943 to Davis, which patent is incorporated herein by reference. This docking system (13) is also utilized at the city station as shown in a multiple dock (23) for receiving several of the terminals (10).

The scanner (12) can scan bar codes and transmit the information by a micro link radio to terminal (10) and, likewise, the terminal (10) can communicate with the printer (11) not only through the docking device (13), but by micro link radio. Consequently, when the driver gets to where the freight is located, he can enter the critical information into the terminal (10) and transmit it to the nearby printer (11). The printer (11) can then print up a bar code, or a number of bar codes if there are a number of packages, and the driver can then put the bar codes on the appropriate packages without having to carry the printer and/or terminal to the packages.

Similarly, a user could set the printer down in one area of a receiving dock and then go around and do is work, such as enter data that he captures into the terminal, such as the destination, origination, address, weight, etc., and then this information would be transmitted over a short range wireless link from the terminal (10) to the printer (11). Then the printer would basically print the bar codes and spool these up for the different boxes. The user would then get the bar codes and put them on the boxes before he loads them into a truck or the like. What the wireless link does is save the user from having to carry the terminal and printer around, continually going back to the printer, hooking it up to the terminal and entering the data. The wireless link is a low cost wire replacement.

Especially for delivery purposes, the drivers will also have a scanner (12). Instead of having a terminal which is wired to a scanner, the drivers would have a wireless link. Therefore the delivery person can just have a terminal (10) on his belt and be able to use a very lightweight scanner to scan the boxes as he delivers them.

The low power wireless link would typically use a 27 megahertz length, which is the same as the CB radio link. That way the power can be kept low so there is a minimum of interference from the CB arena. This would also operate between the CB bands, trying to directly channel onto the CB bands. This radio is a synthesized radio, so it is able to have a minimum of five channels and it can move across the 27 megahertz band if the user does run into interference. It is meant to be a very low cost cable elimination device.

Another aspect of the system shown in FIG. 1 is a wide area network modem so that when the driver goes to his truck, he would put the printer into his truck and drive toward the next stop. At some point during the process, the terminal (10) will dump the data that it collected from the lasts stop, through the printer and out over a wide area at city station (14). This data can then precede the driver who would later arrive at the city station (14). The computer (15) at the city station (14) will then accept the data from numerous different drivers, however many there are in that particular metropolitan area. So when the drivers come in at night, they can already have their scheduling planned. They know they have got so much weight that it has to go to a certain city that night. They know they need a certain size airplane, for example, with a certain amount of fuel in it and consequently this can all be planned well in advance.

Within the city station (14), the host computer (15), along with a controller (16) and multi-dock (23), is provided. As each driver comes into the city station, each driver will dock his respective terminal (10) in a dock that is preferably assigned to him, although this is not necessarily the case. This will download all of the data from the terminal (10) for the day and the computer (10) will then verify that it has or has not received all the data from that vehicle. This is provided just is case some of the data did not get sent over the wide area network.

A basic concept involved in this invention is that the city station (14) is provided so that when the drivers come to the station, they take their terminals (10) and download into the in station host computer (15) through the docking system (23). At that point, the in station host computer (15) will sort the data coming from all of the drivers in the metropolitan area. The computer host (15) will download the information to a certain number of terminals (10). The number of terminals (10) will be dependent upon the number of stations, i.e., the number of people they have working in the stations. The computer host will then download the data base from all of those trucks that came in. The station people will get a terminal (10), along with a wireless scanner (12) and these drivers will begin to unload the trucks. For example, if they have 50 trucks, they will start unloading and building containers to go out to various cities such as Chicago, Los Angeles, etc. So when they take a terminal (10), and a wireless scanner (12), they can scan the label on the freight that was previously printed and put on the box. The terminal (10) will then tell them that the box needs to go to a particular city, for example, to Chicago. They will then go over to the Chicago container, scan the bar code on the Chicago container and the terminal (10) will indicate that this is or is not the container going to Chicago. The driver will then put the item in that container if it is the correct one.

Referring again to FIG. 1, it is noted that the cable (17) is utilized to provide power to the printer and to recharge the batteries of the portable printer (11) as the driver goes from place to place. Antenna (18) is also provided for communication between the printer (11) and the city station (14), which has an antenna (19).

Figure 2:
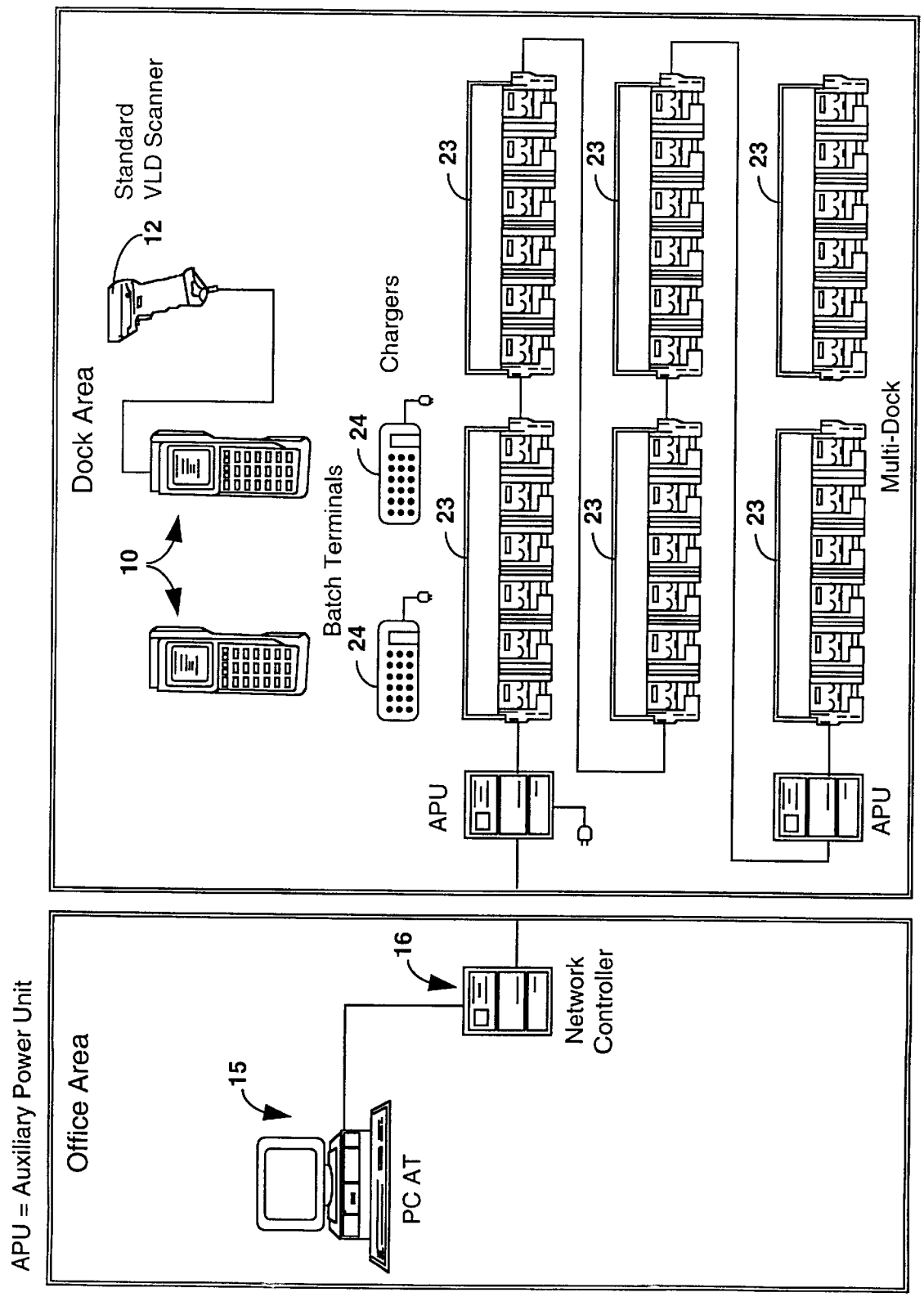
FIG. 2 is a schematic view of a freight stating batch system constructed in accordance with a preferred embodiment of the present invention.

FIG. 2 shows the in-station system with computer host (15) and network controller (16) in the office area communicating with the multi-dock system including various docking devices (23) in the dock area. APU devices are connected between the network controller (16) and the docking devices (23). Charges (24) are provided for charging the batteries on the terminals (10) and charging devices are also provided on the docking system (23) so that the terminals are charged at the same time that the information is downloaded into the host computer (15), for example, as shown in the aforementioned U.S. Pat. No. 5,052,943.

When the drivers come in, as mentioned above, they would put their terminals (10) in multi dock (23), upload the data to the in-station host computer (15). The in-station host computer (15) will then sort the data and download it to the station machines for the use in moving the boxes within the station. Also, for the next day, the station computer (15), overnight, will download to each terminal (10) if it has routing information. The other way the drivers get route information is over the wide area network shown in FIG. 1. So if the driver is out driving around a particular city and a particular freight customer calls into the city station and indicates that it has a box to be picked up, the city station will transmit the message over the wide area radio network and that will be displayed on the terminal of a particular driver, which he can see when he is in his truck and will indicate that he needs to go to the particular customer's place of business to pick up the box. The APU device is essentially for the purpose of powering and charging the terminals (10), the Norand network controller and the host system.

Figure 3:
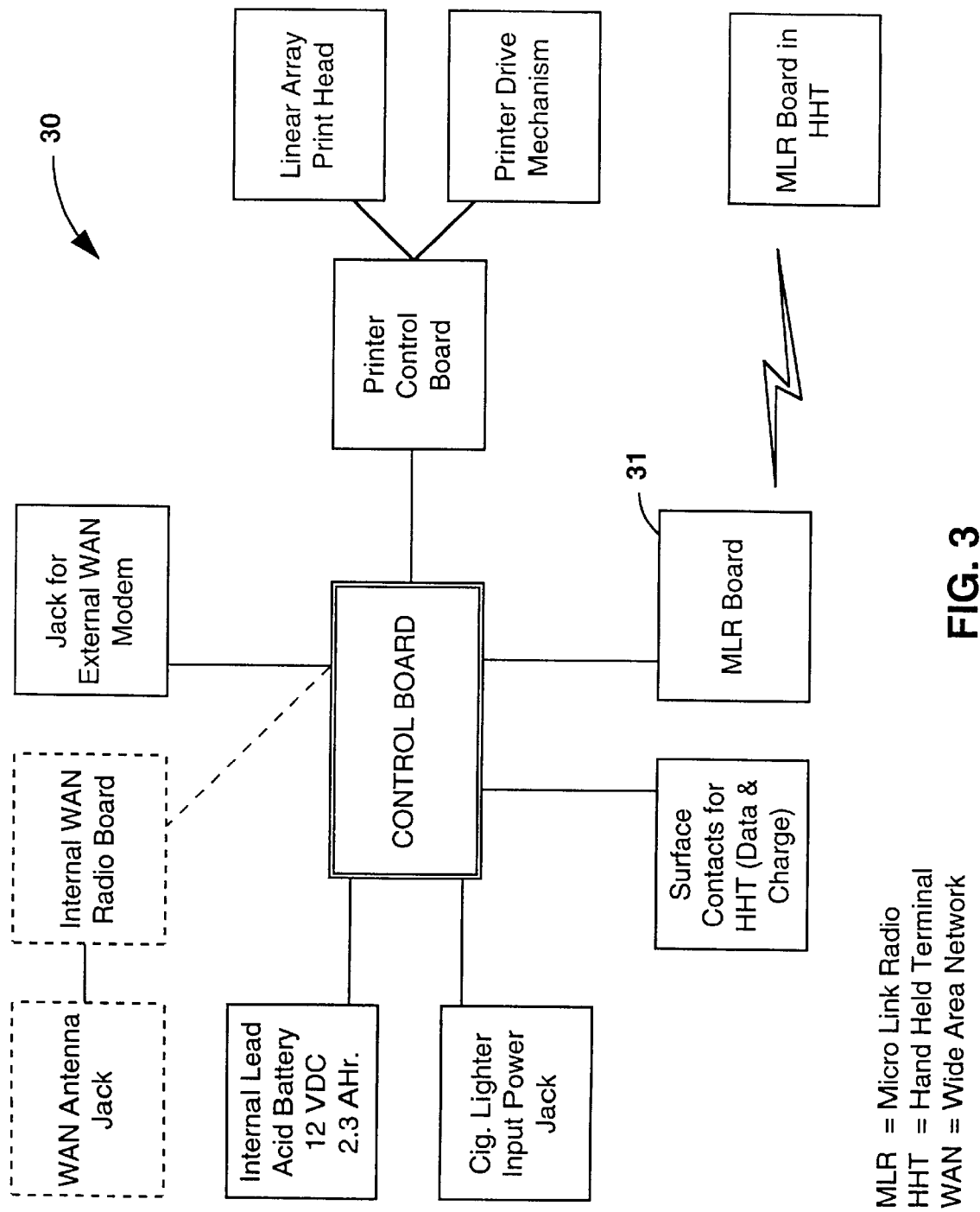
FIG. 3 is a block diagram of a control board system constructed in accordance with the present invention.

FIG. 3 shows a block diagram of a control board (30) which goes to the printer (11). The printer (11) includes a wide area network modem (not shown). This integration of the printer and network modem is particularly useful for freight companies which typically use rented trucks. Since such a freight company might not have the trucks from day-to-day, they can't have a system that goes permanently into the truck that you can never remove. These companies need a system that they can take from day-to-day and go into a different truck. This is permitted in the system shown in FIGS. 1–3 whereby the printer (11) can control the communication between the wide area network through the communication multiplex unit provided.

The master of this system is the terminal (10), but because the devices are packaged in the printer, the control board (30) provides a multiplex data function to communicate with different devices between the terminals (10) and the different devices. The control board (30) handles the wide area network and the printer (11), which is typically a four-inch thermal printer to bring bar codes. The circuit contact for the hand-held terminal, disclosed in U.S. Pat. No. 5,052,943, is the connection to the hand-held terminal (10) if it is physically mounted to the printer (11).

The MLR board (31) is the micro link radio. Through a command structure from the terminal (10), the control board will be told which device to talk to. The control board will route the data to the specific device. Also, if there is an incoming call from the wide area network, the control board will recognized that and will route data to a specific hand-held terminal (10). The control board also handles the power, including the battery charging and the power of the printer through the cigarette lighter input (17), shown in FIG. 1.

Even though the terminal (10) and the printer (11) normally communicate over the micro link radio, the hard contact docking system (13) is provided for basically three reasons. One reason is that so the terminal (10) can charge also from the truck while the driver is proceeding between stops and a second reason is that in case the MLR radio is to fail for any reason, there is still a way to communicate between the terminal (10) and the printer (11). Also, if there is tremendous interference, such as CB interference from highway traffic or the like and the driver is unable to get the terminal to communicate with the printer (11), as a last resort the driver can just walk over to the printer, put it in the docking device (13) and the printer will print. So the driver is never without a way to get his labels printed out.

Figure 4:
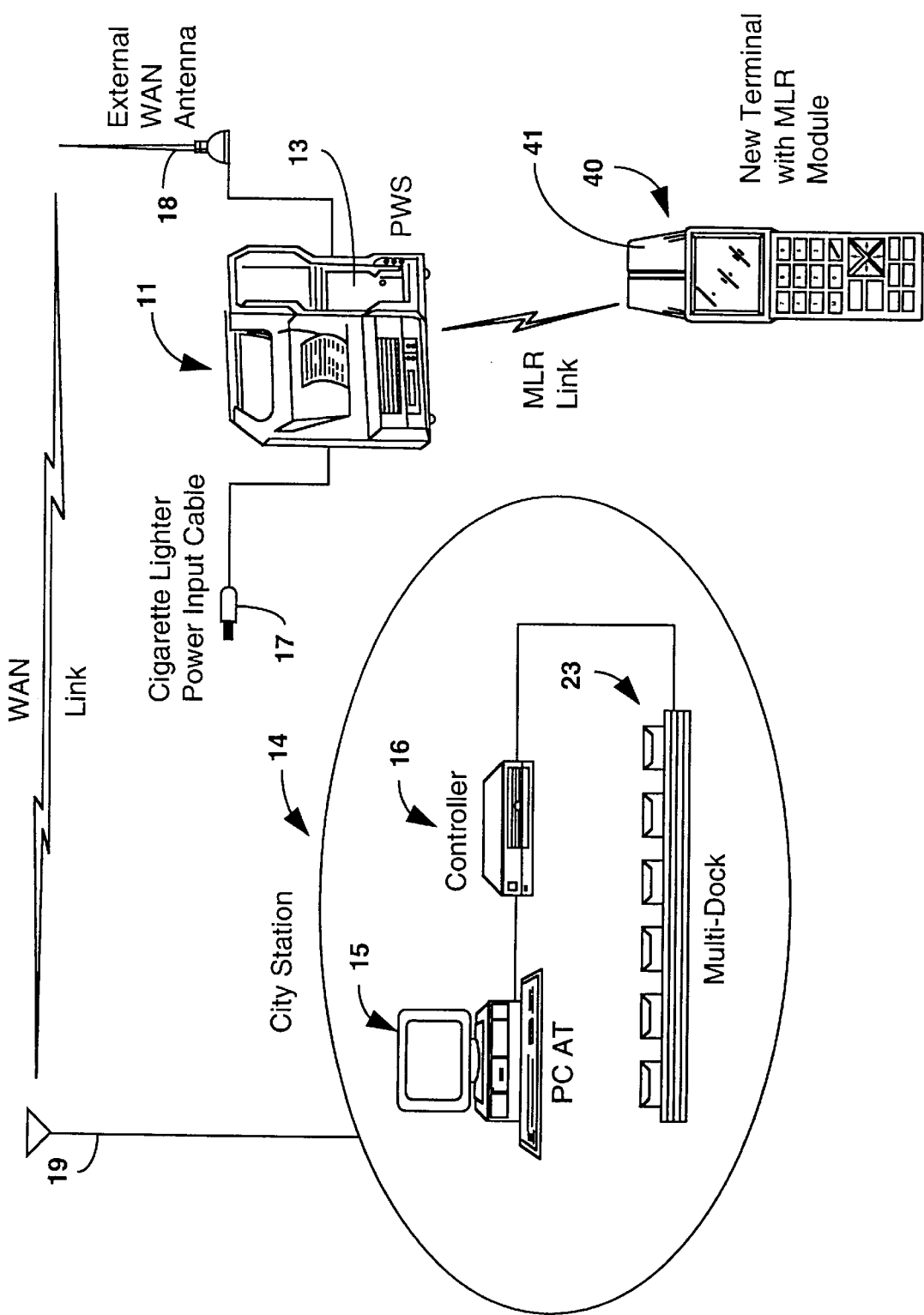
FIG. 4 is a schematic view of another preferred embodiment of a total computerized freight management system.

FIG. 4 is the same system as shown in FIG. 1 except that the terminal (40) is of a type having an integrated scanner (41) therein instead of a separate scanner (12) as in the FIG. 1 system. This has the same basic functionality as the FIG. 1 system except that it integrates the scanner (14) into the terminal (40). It can also be made in a very small size, so that instead of two pieces the driver has only one to carry around when necessary.

Figure 6:
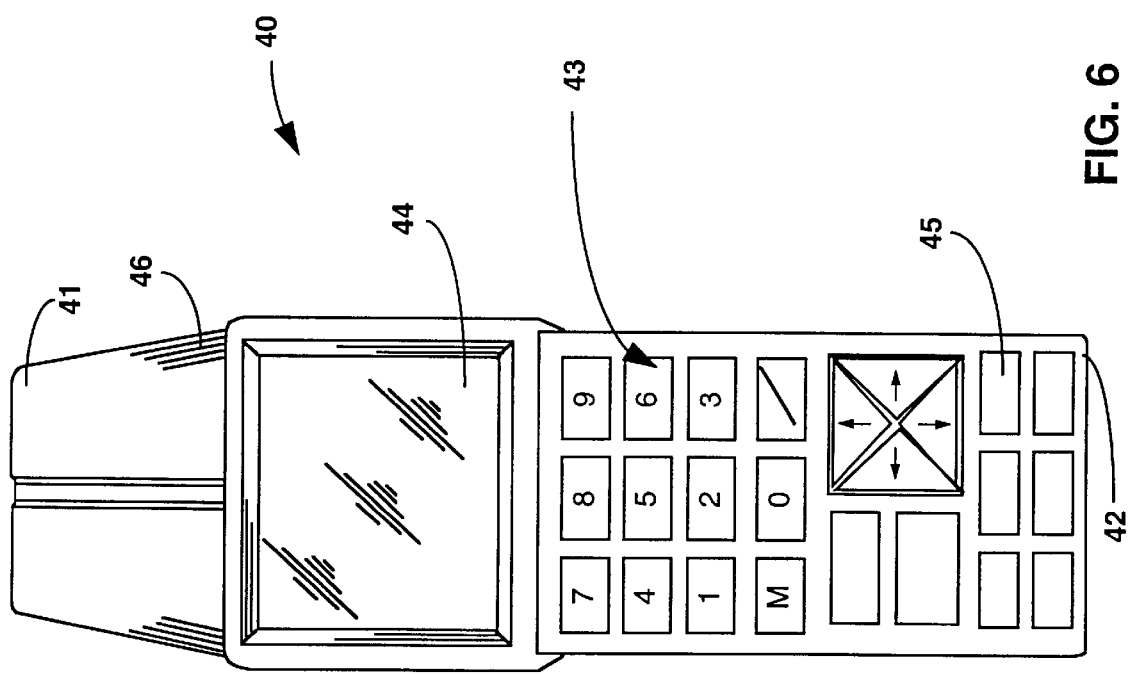
FIG. 6 is an enlarged front view of the combination terminal/scanner shown in FIG. 4.

The terminal (40) with an integrated scanner (14) is shown in more detail in FIG. 6.

Typical placement of numeric keys toward the base end of the prior art data collection terminals is apparently based on the frequent use of the numeric keys. As an operator of the data collection terminal typically holds the terminal in a manner that the base end (42) points toward the operator, the most used numeric keys would be located closest to the operator and be as such most accessible. It has been found that operators of hand-held data collection terminals tend to tire more readily however, when the numeric keys are disposed closest to the base end (42) of the housing, while a positioning of the numeric keys (43) next to and directly below the display screen (44) produces a comparatively less tiring use of the hand-held data collection terminal (40). As a result, the reversal of the numeric keys (43) and function keys (45) from their typical arrangement is considered one of the advantageous improvements in the described handheld collection terminal (40). The hand-held data collection terminal (40) further includes at its top end a laser scanner or CCD type bar code reader (41) and low power transceiver (46), also referred to as micro link radio transceiver (46).

Figure 5:
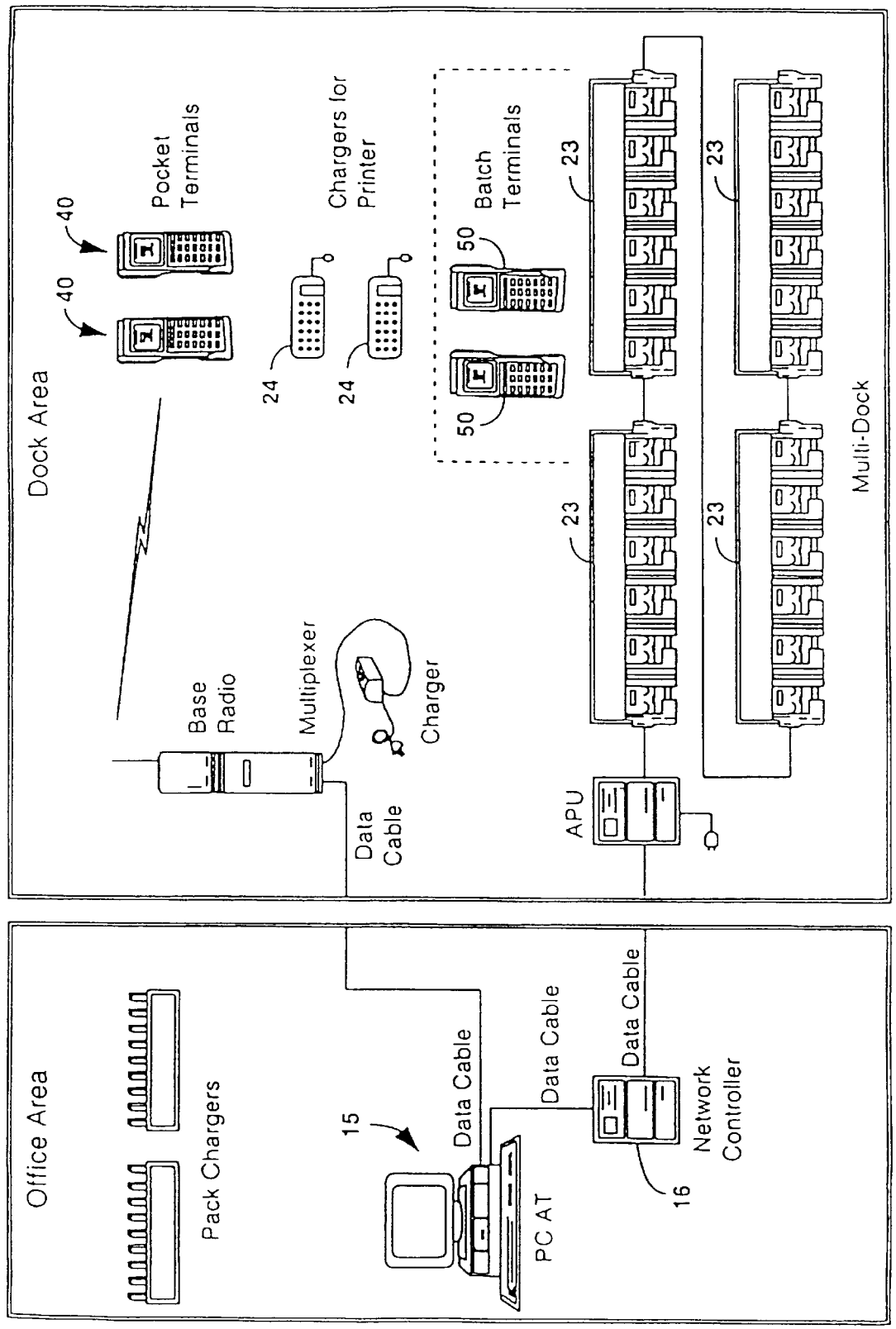
FIG. 5 is a schematic view of another embodiment of a freight station with RFDC.

FIG. 5 shows a station system which is an alternative to the FIG. 2 station system. This system uses radio frequency DC (RFDC). Also, the pocket terminals (40) are radio frequency terminals with integrated scanners like that shown in FIG. 4. Batch terminals (50) are also utilized from the a system.

The aforementioned system has three basic functions. First of all, there is the freight pickup system where the user would primarily use the terminal and the printer to print labels. Secondly, it is a delivery system primarily using the terminal and a scanner to scan and deliver products to customers. Thirdly, it is a station system which is meant to unload the trucks that are coming in and build containers that are going back out of the station every night.

DESCRIPTION OF FIGS. 7–13

Figure 7:
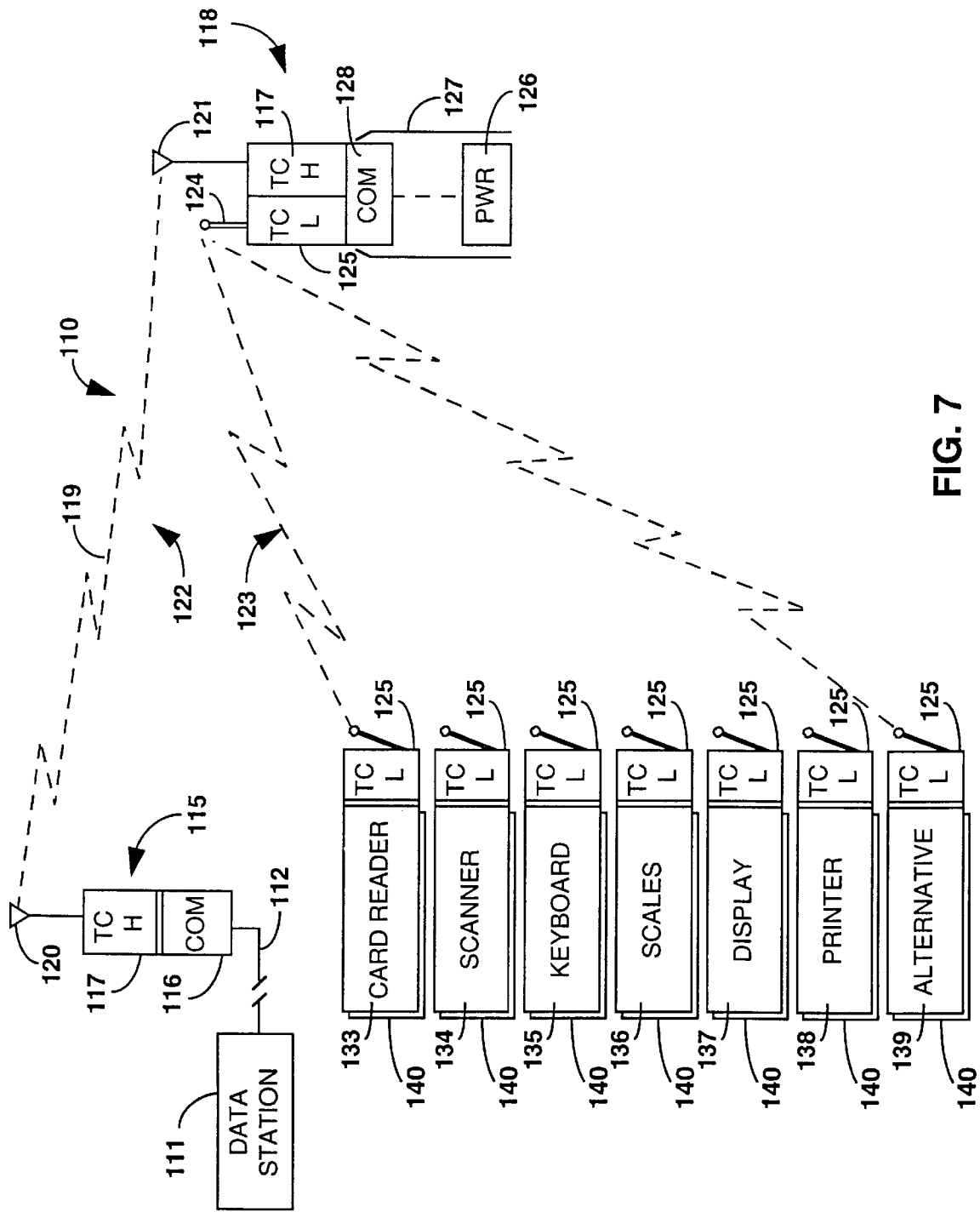
FIG. 7 shows a schematic representation of a hierarchical communication system, showing various components which are contemplated to interact in a low level, low power communication network of the communication system.

Referring now to FIG. 7, there is shown a multi-level, hierarchical mobile data communication system, referred to generally as a data system 110. The term "mobile" denotes the mode of operation of the data system 110 in general. Most of the terminal devices of the data system 110 are portable in the sense of being internally powered. These devices are adapted to be carried about by an operator either to be taken to where they are to be used, or they may be carried about while actually being used. In its hierarchical structure the data system 110 may be coupled to a stationary central or host computer 111 ("DATA STATION"). In many applications, the host computer is a mainframe computer and would not be "mobile" by itself. While the data system 110 as further described herein may communicate with a mainframe computer such as the host computer 111, the host computer 111 need not be part of the data system 110, as herein further described, for the data system to function in accordance with the present invention.

In further reference to FIG. 7, the host computer 111 may be coupled to communicate via a typical communication cable link or optical fiber link 112 to a communications interface 115. The term "communication" is used to apply to the transfer of data messages of information, operational instructions or combinations of information and operational instructions. Communication may also take place via radio frequency transmissions and receptions. When a data message is described as being transmitted from one device to another, an established link may be presumed. However, though a message is generally received by all terminals operating on the same frequency, selective addressing precludes processing of a message not addressed to a particular terminal. Therefore, the term "communication" also includes "selective communication".

The communications interface 115 includes a communications multiplexer module 116 and a transceiver 117. The transceiver 117 may be a frequency modulation ("FM") transceiver, operating on a frequency band allocated by the Federal Communications Commission to industrial FM transmissions. (Alternatively, a spread spectrum transceiver may be used.) The transceiver 117 is referred herein as having a high power transmitter and corresponding receiver module. Typical "ranges" over which such a transceiver can effectively transmit may be to five thousand feet or even longer. Transmitters operating on industrial FM transmission bands are subject to strict regulation by the Federal Communication Commission. Manufacturing costs and quality assurance procedures for the transceivers are moderately high to meet or exceed the required transmission standard. The term "high power" is used as a relative term to identify and distinguish one type of data transmission operation with respect to another type of transceiver module of a data communication device 118.

The communication device 118 also includes a matching transceiver 117 which forms a second terminal of a high power communication or transmission link 119 between respective antennae 120 and 121. The transceivers 117 correspondingly represent the terminal devices of a high power data transmission system 122 including the communications interface 115 and a shared portion of the communication device 118. The transceivers 117 consume during operation a considerable amount of electrical energy. A self-contained power source may therefore be of sufficient weight to negatively impact on the portability of the communication device 118. Of course, the communication device 118 may also be vehicle-mounted and be conveniently powered by resident vehicle power.

The antennae 120 and 121 are depicted schematically by typical triangular antennae symbols representative of the high level transmission system 122. In a hierarchical arrangement with the high level transmission system 122, FIG. 7 also shows components of a low level, low power transmission system. In the hierarchical data system 110 both high and low power transmission systems are preferred to be operated interactively as integrated subsystems of the data system 110. The present subject matter relates to newly discovered advantages of the low power or low level transmission system that can be available to users even in the absence of the hierarchical structure of the data system 110. The low level transmission system, designated generally by the numeral 123, is identifiable by devices including a low power transceiver including a respective antenna in the shape of a stick with a rounded end. A low level antenna 124 extends from the communication device 118 and particularly from a low level, low power transceiver 125 ("TC L") of the communication device 118. Each of the components of the low power transmission system 123 are coupled or associated with a respective one of the transceivers 125. The transceiver 125 communicates with first type radio frequency transmissions which are low power type transmissions in comparison to those of the transceiver 117, which are referred to herein as second type or high power transmissions. Desirably, the respective communication channels of the transceivers 117 and 125 are isolated from each other, allowing the low power transceivers 125 to communicate without interference with the high power communication of the transceivers 117. Isolated channels may be obtained by various means including the use of different frequencies or distinct, non-interfering modulation methods. Accordingly, all of the low power transceivers 125 are compatible and are adapted to communicate among each other, and all of the transceivers 117 would be compatible with each other and be adapted to communicate among each other. On the other hand, there can be no communication between a transceiver 117 and a transceiver 125.

In contrast to the transmission range of the high power transceiver 117, the expected range of the low power transceiver 125 is quite short. A typical low power transmission range may be expected to lie between ten and fifty feet. The maximum range of transmission may be no more than a few hundred feet. For the respective low power transmitting devices, such as the transceiver 125, operational standards are more relaxed. As a result, the production costs of RF frequency communication systems using low power transceivers 125 are well below those of comparable systems using the high power transceivers 117 for maintaining their communications links. The low power transmission system 123 has, therefore significant cost advantages over a comparable high power transmission system 122. Whenever data system components which are linked by RF transceivers are to be used in an environment wherein only short distances are expected to separate the linked components, the low power data transmission system 123 would appear to be advantageous with respect to the high power data transmission system 122.

FIG. 7 schematically emphasizes a connectable power source 126 coupled to the communications device 118. Particularly because of the anticipated power to operate the high power transceiver 117 over an extended of a typical working period, a more substantial and powerful power source such as the source 126 is preferred. The source 126, for example a rechargeable type NiCad battery, may include circuitry for alternate power to be supplied and to control a recharging operation.

Figure 8:
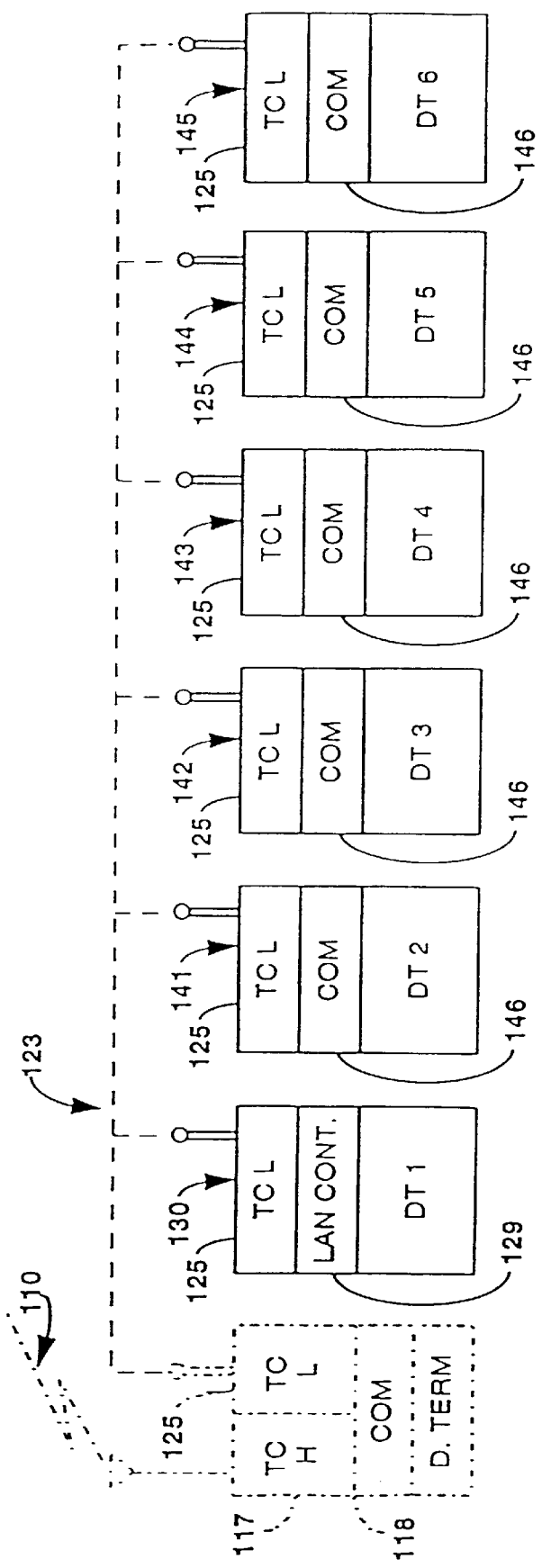
FIG. 8 is a schematic representation of an embodiment of the invention, showing components of the low power communication system communicatively coupled to operate independently of a relay device.

The battery 126 supplies power to all functions, including both the high and low power transceivers 117 and 125, respectively, as well as a communication module ("COM"), also identified by the numeral 128. The communication module 128 of the communication device 118 includes those functions by which the communication device 118 becomes an effective interface between the high power and low power data transmission systems 122 and 123. The communication module 128 may include data modulation and demodulation circuits, converting signals between digital data signals and signals for transmission by either transceiver 117 or 125. The communication module 128 may further include identification and address circuits for implementing a protocol for a Local Area Network ("LAN"). According to a particular embodiment, as described herein generally with respect to FIG. 8, a LAN communication procedure advantageously resides in a communication circuit 129 of a selected data terminal device 130 ("DT 1") of the low power data terminal devices ("DT 1" through "DT 6"). In a particular embodiment described herein below, the LAN communication procedure preferably resides in a communication circuit 131, referred herein as "CONTROL BOARD", of a printer device 132 (see FIGS. 3 and 1). Other coupled data terminal devices of the system 123, identified as "DT 2" through "DT 6" are capable of communicating with the data terminal device 130 in the absence of the communication device 118. In the hierarchical system of FIG. 7, the low power transceiver 125 of the communication device 118, and, in essence the communication device 118 as such is part of the low power LAN. In the embodiment of FIG. 8 the communication device 118 non essential and is removable without disruption to the operation of the low power system 123.

With respect to FIG. 7, the communication module 128 of the device 118, in a memory circuit thereof, or any microprocessor circuit in combination with typical memory circuits, including random access storage and read only memory. The read only memory would include protocol instructions which control the operation of the LAN. By incorporating the LAN control or master protocol into the communication device 118, the communication device 118 is the LAN controller for a number of data terminals 133 through 139. The typical LAN type operation among the data terminals, such as the data terminals 133 through 139 may be altered by the protocol applicable to each of the data terminals 133 through 139. Instead of directly communicating with each other, communications among the data terminals 133 through 139 can be relayed per FIG. 7 through the controlling data communication device 118. As directed by a protocol, the communication device 118 may specifically address and re-transmit to one of the data terminals 133 through 139 within the LAN data messages which were received from another one of the data terminals of the LAN. Generally, however, a LAN type operation permits data terminals within the LAN to communicate on the same frequency or channel, hence, on an equal level among each other.

The data terminals 133 through 139 in FIG. 7 are particular examples of various data terminal devices which may be coupled to function interactively within the low power system 123 or LAN. In general, a data terminal may be considered as being a data transducer. For example, the identified data terminal devices may be data input devices, data output devices, both or even a combination of several of such devices. Whether they are data input or output devices, the data terminal devices may "transduce" data from electrical "ones" and "zeroes" to visual or audible signals or characters, or electrically or magnetically stored binary quantities. In reference to the exemplary elements referred to in FIG. 7, a card reader 133 ("CARD READER"), a scanner 134 ("SCANNER"), a keyboard 135 ("KEYBOARD") and scales 136 ("SCALES") would be typical data input devices. These data input devices may receive data from sources external to the system 110 and transfer the received data to the data system as digital, binary data signals.

The card reader 133 can be a well known credit card reader, reading the typical magnetic stripe on the typical plastic card, or it may be a reader of punched holes or of magnetically encoded indicia on invoice cards which accompany shipments of goods. The low power system 123 may desirably also include a corresponding magnetic stripe writer or hole punch as an example of alternate devices ("ALTERNATE"). Magnetically encoding and decoding data on disposable tickets is known and is used by public transportation systems. Here, the alternate devices 139 are coupled into the low power system 123 to function as mobile components thereof.

The scanner 134 may read various types of indicia, such as bar codes, characters or text, or it may be a device such as a CCD image reader which can read signatures and cause them to be entered as a record. Though the above input devices may primarily direct data into the system, address codes may nevertheless be received by the input device. Consequently, whether the primary data stream flows in one direction only or in two directions, the resulting data flow is referred to herein as data communication. In a typical operation as contemplated the scanner 134 identifies marked codes on merchandise items (not shown), and translates such identified codes into digital binary coded data signals. Various models of such laser scanners 134 are known and are commercially available.

The keyboard 135 may be an alphanumeric keyboard of standard size for a computer or typewriter, or it may be an alphanumeric keyboard of compressed size, as used with respect to portable, hand held data terminals. The keyboard 135 may, of course, be simply a numeric keyboard including possibly certain function keys, such as for arithmetic operations and for generating other instructional codes.

The scales 136 are contemplated to be digital electronic scales. As such the scales record a measured weight as electronically encoded digital signals. The scales may also provide a human readable digital output. The recorded weight is further communicable by digital signal transmission. Scales having weigh cells for transducing weight into an electronic data signal with a value equivalent to the magnitude of the sensed weight are generally known. In accordance herewith, it is contemplated to incorporate the scales 136 into a flat weight platform, preferably with a wedging edge that may support one side of an article to be weighed. The scales would typically weigh only one side or edge of the article, whereupon the position of the scales would be changed to the opposite edge of the article to be weighed. The combined weight measured at both edges is added to yield a rather accurate estimate of the total weight of the article.

In distinction over the described data input devices, the display 137 and the printer 138 are data output devices. The display 137 may be an LCD display, which may comprise an output screen of several lines for displaying alphanumeric data, it may be an LCD array of individually addressable pixels for both alphanumeric or graphic displays, or it may be one of several known luminescent data display screens including a typical cathode ray tube. For reasons of portability, an LCD display screen is preferred because of typically lower power requirements with respect to other display screens in the operation of such a device.

The printer 138 may be a thermal printer, such a printer being one type of printers with comparatively lower power requirements than mechanical impact printers. As a particular example, the printer 138 may be a bar code printer which translates data messages into machine readable codes. The codes may be printed on adhesive labels which are attached to packages or items which may be transported or delivered in typical merchandising operations. In another particular example, the printer 138 comprises a bar code and alphanumeric printer in combination with a magnetic stripe recorder, the recorder being in essence a printer of magnetically identifiable digital signals. The described data output devices receive data as binary data messages and translate such messages into either machine readable format or into alphanumeric display character messages, hence into human-readable messages.

The described data input and output devices 133 through 138 and the alternate data terminal device 139 ("ALTERNATE") are uniquely characterized in that each includes one of the low power transceivers 125. Each of the data terminal devices 133 through 139 also includes the communication circuit 128 or similar circuitry for modulating and demodulating data messages. Each of the data terminal devices 133 through 139 desirably also include a LAN protocol circuit which may be part of a communication circuit, such as the communication circuit 128. Each of the data terminal devices 133 through 139 preferably also includes a self-contained power source 140, as indicated by the stacked block representation in FIG. 7. Because of a lower power requirement of the transceiver 125 with respect to the transceiver 117, the power requirement for the transceiver may be small, in comparison to the power requirement of the corresponding data terminal device. Since the power source 140 is adapted to serve the needs of both the data terminal device and the low power transceiver 125, the power source designated 140 may vary in size and storage capacity, depending on the type of device to be served. Generally the power source 140 is smaller, typically in size and weight as well as in storage capacity, than the power source 126 of device 118. It is further contemplated to combine certain functionally related devices into a single component of the low power system 123.

In FIG. 8, each of data terminal devices 141 through 145 ("DT 2" through "DT 6") include the low power transceiver 125 ("TC L"), a predetermined communication function 146 ("COM") which includes an operating protocol for the respective device, and of course the respective device function itself which may differ for each of the devices and may combine in each a combination of the devices as described with respect to FIG. 7 The communication function is preferred to be a multifunction integrated circuit which may include programmable constant storage memory locations. Constants or values stored in the respective memory locations may be determinative of the operation of the respective device. For example, the scanner or data terminal device 141 may retain in its memory stored an address code which prefaces in each data communication the message of scanned data and determines which other data terminal receives the transmitted data message. The data message address code may be switched from one stored code to another according to a stored program of the communication function 146. A transmitted message of scanned data may be routed as a result of the switch to the data communication device 118 instead of to the LAN controller device 130. The LAN controller of the device 130 is contemplated to be housed with a portable or self-contained printer device. The communication circuit 129 in such case may include a certain data storage capacity which will permit the device 130 to receive and retain scanned bar codes. Whenever the data communication device 118 becomes coupled into the low power communication system 123 stored data from the printer device 130 are transferred via the relay link of the communication device 118 to the central data processing station 111, for example.

It is to be understood that within addressing limits of the protocol and transmission time allocations, each low power communication system 123 may include more of the data terminal devices than those shown as representative devices in either FIG. 7 or FIG. 8. A particular time share communication program may provide for 16, 64 or even 256 devices to become coupled to the same low power communication system 123. In the system 123 each of the devices may communicate either with the controlling device, such as the printer device 130, or with any of the other devices, shown as 141 through 145, as an example.

Figure 9:
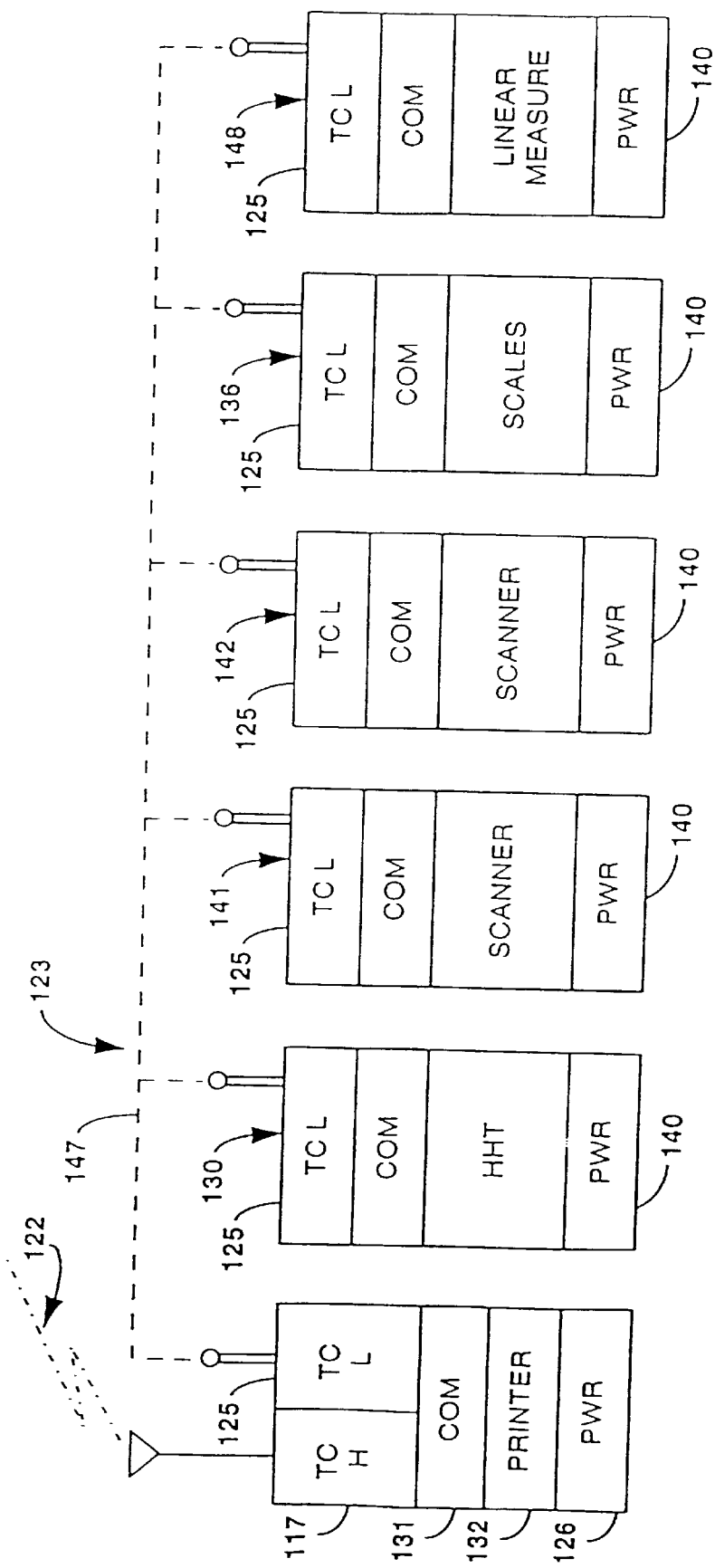
FIG. 9 is a schematic representation showing preferred components according to the invention linked into a low power communication system, the components including weight measuring and linear measuring devices and code scanning devices communicatively interacting with a data collection terminal and a printer device.

FIG. 9 depicts schematically specific ones of the generally described devices that are particularly adapted to track containers and crates in shipping operations. As a general overview, the devices depicted in FIG. 9 include data input devices such as the scales 136 or as the scanner devices 141, 142, and data output and control devices including the printer 132 and the data collection terminal 130. According to FIG. 9, the printer device 132 is equipped with the already described self contained power source 126, a battery module of increased capacity and size. The printer device 132 includes in addition to the low power transceiver 125 a high power transceiver 117 for communication within the high level system 122, also referred to herein as "Wide Area Network" or "WAN". The communication circuit 131 includes, consequently, besides data storage for the communication protocol additional circuit elements for transferring data messages between the low level communication system 123 and the high level system 122 ("WAN"). The data terminal device 130 is preferably a hand-held or portable data collection terminal 130 as shown and described in greater detail below in reference to FIG. 12.

In the schematically depicted system 123 of FIG. 9, the printer device 132 is shown as being coupled via a low power RF link 147 to the scanner 141, a second scanner 142, the transceiver equipped weighing device or scales 136 and a transceiver equipped linear measuring device 148. The referred-to devices are basic data collection and recording devices for a highly automated freight transport system. Weight and linear measurement data on containers are collected and recorded in electronic binary data format. The interactions of the data collection terminal 130 with the printer device 132 and various of the data collection and recording devices or combinations of the devices coupled to a common low power transceiver 125 are particularly adapted to track containers in express shipping operations. At each operating station, such as a route pickup point, or a transfer point of articles in transit, the printer device 132 and the data terminal 130 operates in conjunction with other of the devices to create or update a shipping record that may be transmitted via the high power link 122 to the host computer 111 (see FIG. 7), or that may be used to accompany the articles in transit.

Particular for air freight, reasonably accurate weight and volume determinations play a significant role. For an air freight operation to function most efficiently, weight and volume determinations of shipping containers need to be made quickly and with reasonable accuracy. Thus, a freight or package pickup driver may estimate the size and the weight of containers received at one or more pickup points of a pickup route, however, to most efficiently and safely transport the freight via airplane to its destination, the actual weight and size of each container or package to be shipped by air freight must become known accurately within negligible tolerance levels. The devices needed for determining the weight and size of shipping containers to be picked up would be carried by the route operator to the pickup site at a customer's location, for example. In a state of the art system, the route driver may use a typical tape measure to obtain the dimensions of the shipping containers or packages to be picked up. The route drive may also either estimate the weight of each of the boxes when they are large, or simply verify the data provided by the customer. The weight of rather large shipping containers is, however, difficult to estimate.

Figure 10:
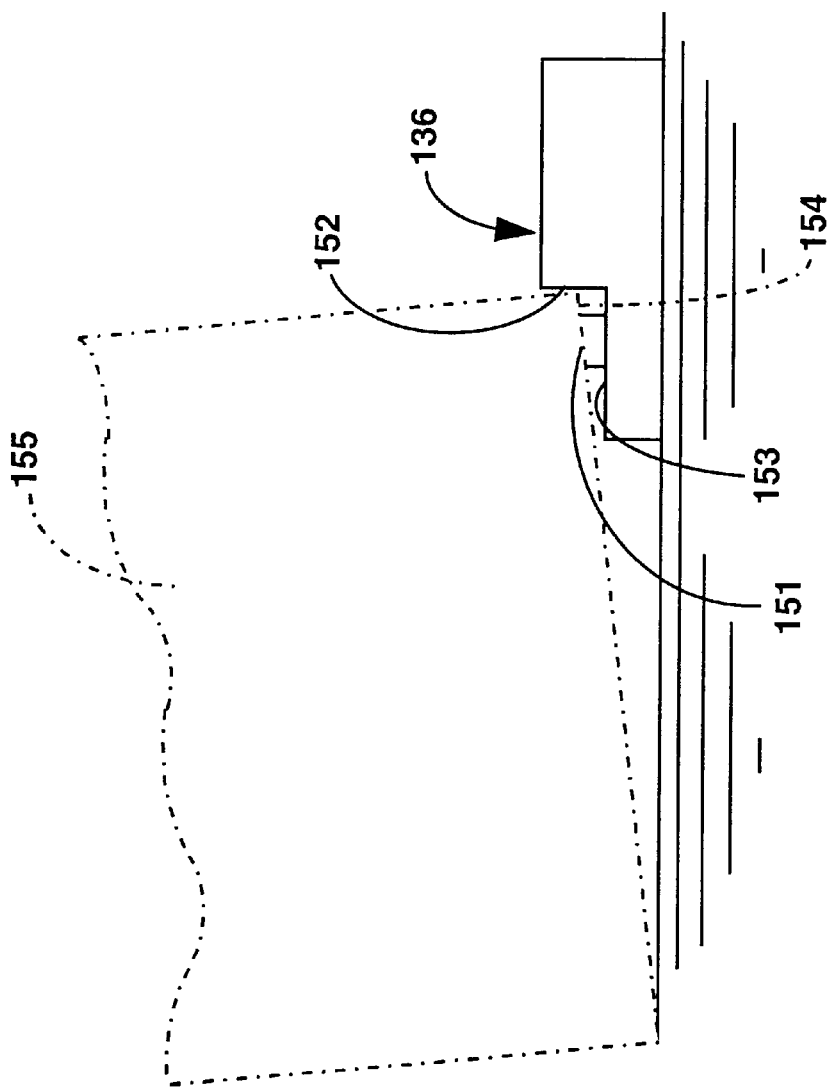
FIG. 10 is a somewhat schematic representation of a weight measuring device and a container disposed to be weighed thereby.

In reference to FIG. 10, a preferred embodiment of the scales 136 provides a weighing base or contact plate 151. The contact plate 151 is a sensor of a weigh cell disposed within the scales. The contact plate 151 is positioned adjacent a reference ledge 152. The reference ledge 152 extends above a base plane 153 in which the weighing contact 151, a transducer switch, is mounted. The transducer switch produces an analog signal corresponding to the weight or pressure exerted against the external contact plate 151 thereof. The analog signal is electronically calibrated to be representative of a weight on the contact plate 151. The analog signal is then converted to a binary digital signal and may be temporarily store within the scales 136. The digital signal is further modulated and is transmitted via the transceiver 125. To weigh a box of any size, the weight can be determined with reasonable accuracy when first one side and then the other side or the box are weighed and the two indicated weights are added. FIG. 10 shows the weight scales or weigh cell 136 disposed under a first edge 154 of a shipping container or box 155 which is shown in phantom lines. Since the box 155 is lifted along the first edge off the ground, its weight is supported by a second edge 156 against the ground and at its first edge 154 by the weighing contact 151. After weighing the first edge 154, the routed driver or operator simply removes the scales 136 from the first edge and places the scales 136 in a similar manner under the second edge 156. Even if the center of gravity of the box and its contents is packed closer to the one edge than the other, the two weight measurements when added provide with reasonable accuracy the actual weight of the box and its contents. A minor error resulting from the tilt of the box 155 amounts to no more than two percent of the measured weight for angles of tilt of the box 155 of less than ten degrees.

Figure 11:
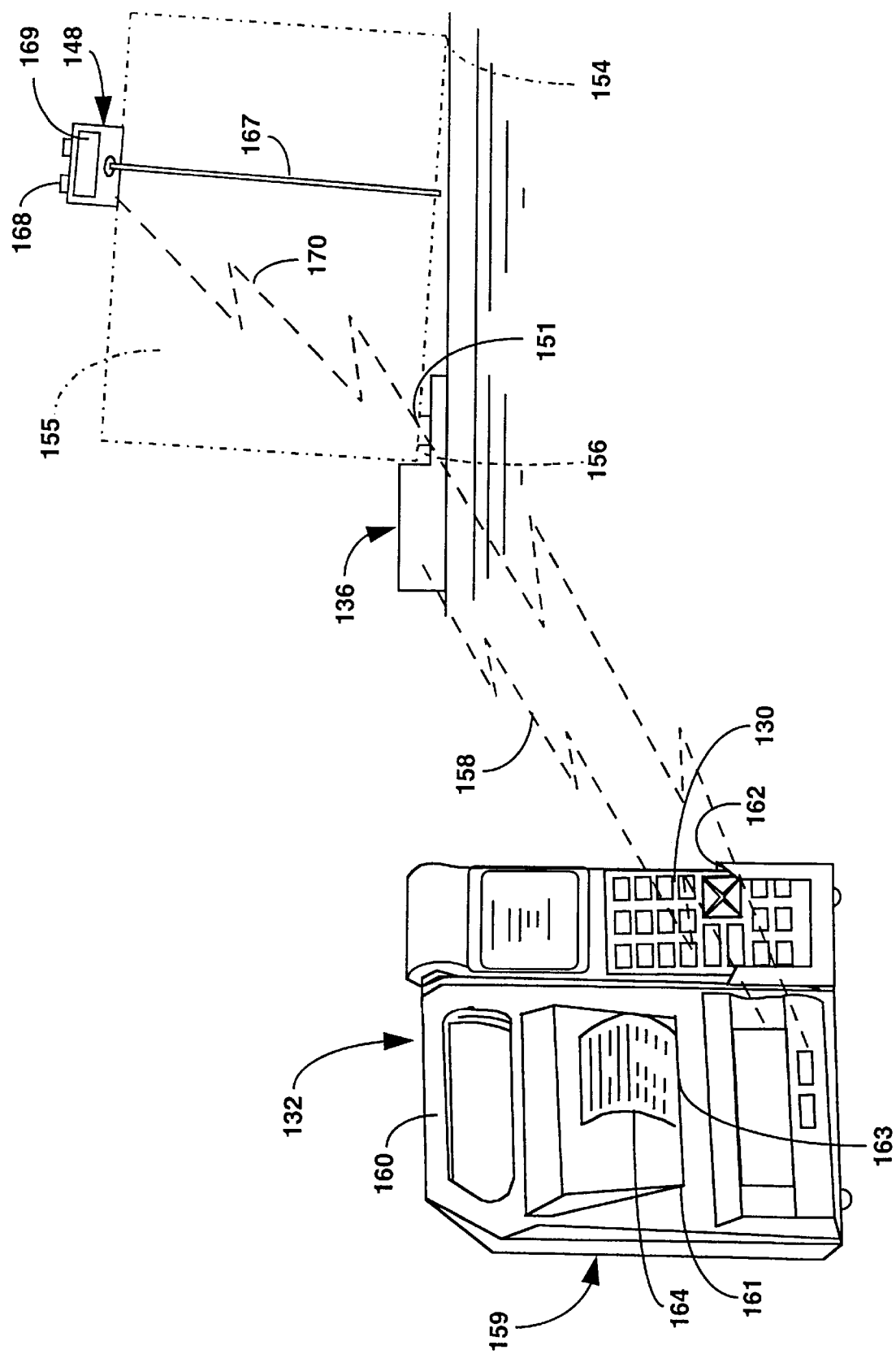
FIG. 11 is a somewhat schematic representation of a weight measuring device and of a linear measuring device, both devices being linked by a low power communication link to a printer device.

FIG. 11 shows the weigh cell or scales 136 disposed under the second, opposite edge 156 of the box 155. A communication link 158 is schematically indicated as transmitting the measured weight data in a data transmission message to the printer device 132. In the preferred example described herein, the printer device 132 is a hand-portable printer, the printer mechanism being disposed within a briefcase type housing 159 which also features a carrying handle 160. The housing 159 preferably has first and second housing cavities 161 and 162. The printer mechanism, shown only schematically by a printer head 163 adjacent a printed material 164, is disposed entirely within the first housing cavity 161. The second housing cavity 162 holds removably mounted therein the hand-held data collection terminal 130 ("HHT"). Reasons and advantages for removably "parking" the HHT 130 in the second housing cavity 162 will be best understood from a more detailed description of the HHT or data collection terminal 130 in reference to FIG. 12 below. According to the operation of the printer device 132 and the data collection terminal 130, temporarily inserting the data collection terminal 130 into the second housing cavity 162 of the printer housing 159 may selectively cause the low power transceiver 125 of the data collection terminal 130 to become deactivated. Communication of data between the printer device 132 and the data collection terminal 130 preferably occurs by hard coupled electrical data connections rather than by the low power RF communication between the respective transceivers 125 while the data collection terminal 130 remains in the housing cavity 162. Typically the data collection terminal 130 includes substantial memory circuits and microprocessor circuits for data processing. While the data collection terminal 130 remains coupled to the printer device 132, the microprocessor circuits may be utilized by the controlling printer device 132 in processing data received via the low power RF transmission links.

By temporarily placing the data collection terminal 130 into the second housing cavity 162 of the printer device 132 the route driver or operator has more freedom to collect shipping data of the articles to be shipped. The operator may need to lift the shipping containers or boxes 155 to weigh them and measure their dimensions. With the printer device 132 placed on the floor in the vicinity of the shipping containers 155, or mounted in the route vehicle outside the shipping area where the containers 155 are located, the operator is free to move about to obtain measurements and weights of the containers 155.

To obtain weight measurements of a number of shipping containers 155 at a warehouse location, the operator may simply weigh each of the containers at first and second opposite edges. After each set of two weight measurements the scales 136 would be cleared, the last two readings would be combined and the combined readings would be stored. The operator may identify the sequence of the boxes weighed by hand numbering the boxes 155 if a relatively large number of boxes 155 are to be picked up at a particular location.

After weighing each of the boxes 155, the operator may then proceed through the sequence of the same boxes 155 and obtain their linear measurements. For example, a selected algorithm may accept three consecutive measurements as the length, the width and the height of the box 155 being measured. FIG. 11 shows the linear measuring device 148 positioned to measure the height of the depicted box 155. The measuring device 148 may include an extendable string or tape 167 the extended length of which is measured and recorded by an electrical transducer, such as by an internal capstan (not shown). With the string or tape extending the length of the distance to be measured, the operator simply enters the measured dimension by pushing a button 168 of the device 148. The generated linear measurement may be in an analog output form, or is preferably a digital output generated by increments of rotation of the internal capstan, for example. An LCD screen 169 may give a visual confirmation of the dimension measured. The entry of the measured dimension on pushing the button 168 may record the measured dimension in a memory internally of the measuring device 148. In distinction over other linear measuring devices, the low power transceiver 125 of the linear measuring device 148 is coupled to read the stored measured dimension and transmits a data message corresponding to the value of the measured length to the printer device 132 via a communication link 170, thereby entering the measured value into the data system 123 without further action by the operator. The communication circuit 131 of the printer device 132 preferably contains a microprocessor circuit and associated memory, or, alternatively, computation logic circuit and memory circuits to process and store the received measurement data. Processing and storing the received data includes the sequencing of the data through programmed routines to automatically compute and store the total weight and the volume of each of the boxes 155 weighed and measured.

The order of the above weighing and measuring sequence for determining both weights and measurements of shipping containers 155 may of course be altered. It may be preferred, for example, to both weigh and measure one box 155 before proceeding to measure and weigh the next box 155. The preferred procedure may be programmed and is then followed. Alternative weighing and measuring procedures may be programmed and may be selected as preferred by an operator.

Figure 12:
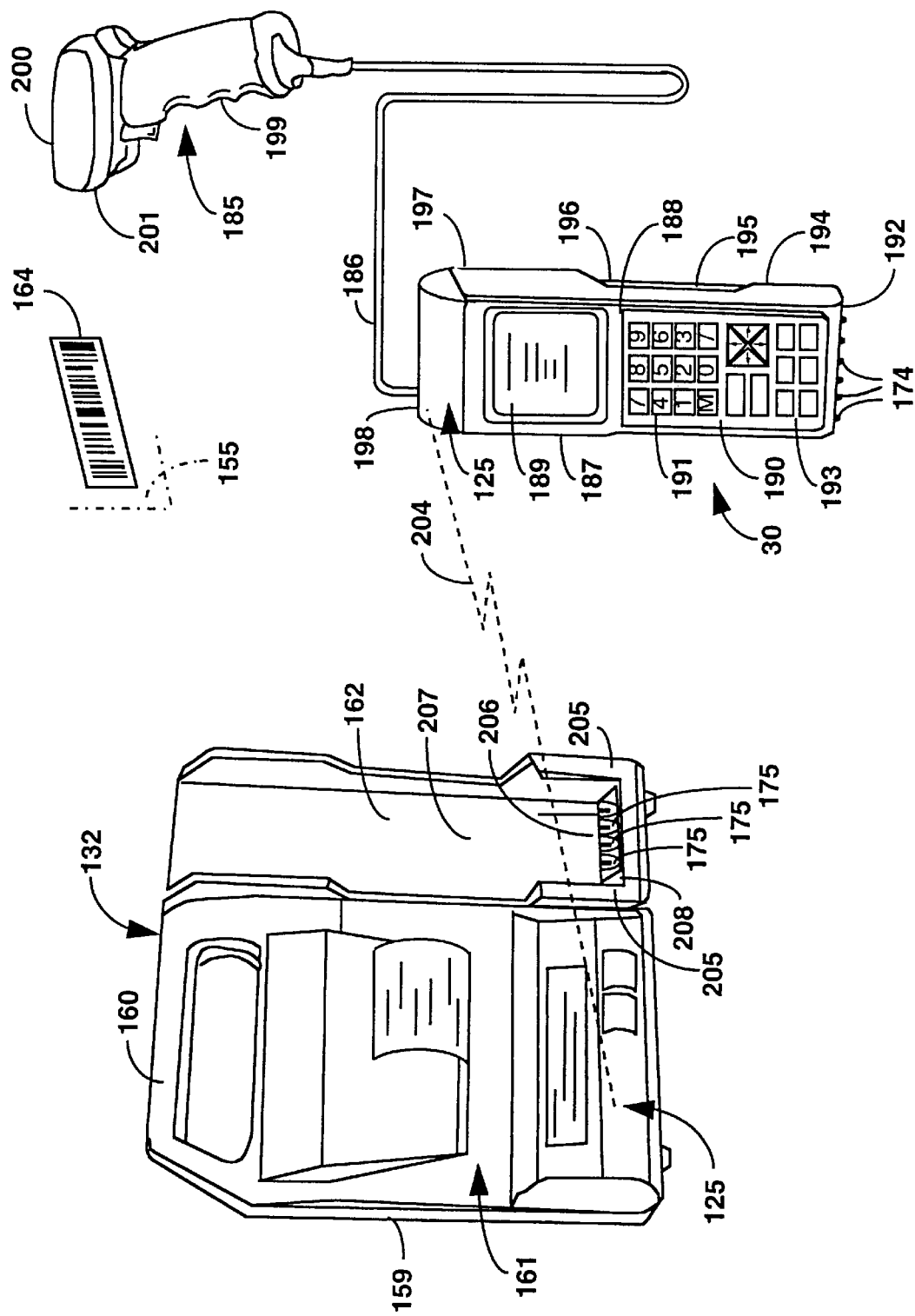
FIG. 12 is a simplified pictorial representation of a low power data link communicatively coupling a data collection terminal and a printer device.

FIG. 12 shows the printer device 132 and the data collection terminal 130 in an alternate embodiment wherein a hand-held bar code reader or scanner 185 is electrically coupled by a data cable 186 to the hand-held data collection terminal 130. The data collection terminal 130 is in its overall structure a typical hand-held data terminal similar to commercially available models, such as those presently marketed by the assignee of the present application. Such terminals have an elongate housing 187 and feature on a front side 188 an LCD screen 189 for displaying typically alpha-numeric data. A keyboard 190 differs from standard keyboards by a new positioning of numeric keys 191 directly adjacent and below the screen 189. Typical keyboard arrangements provide for the more frequently used numeric keys 191 to be positioned adjacent a base end 192 of the housing and to position function keys 193 adjacent the LCD screen 189. The hand-held data collection terminal features on its rear side 194 of the housing 187 a well accepted recessed hand grip configuration 195 and an elastic hand strap 196 which is attached adjacent the base end 192 of the housing 187 and near a top end 197 thereof, stretching spacedly across the recessed hand grip configuration 195.

Typical placement of numeric keys toward the base end of the data collection terminal 130 is apparently founded on the frequent use of the numeric keys. As an operator of the data collection terminal typically holds the terminal in a manner that the base end 192 points toward the operator, the most used numeric keys would be located closest to the operator and be as such most accessible. It has been found that operators of the hand-held data collection terminal tend to tire more readily however, when the numeric keys are disposed closest to the base end 192 of the housing, while a positioning of the numeric keys 191 next to and directly below the display screen 189 produced a comparatively less tiring use of the hand-held data collection terminal 130. As a result, the reversal of the numeric keys 191 and function keys 193 from their typical arrangement is considered one of the advantageous improvements in the described hand-held data collection terminal 130. The hand-held data collection terminal 130 further includes at its top end an end cap housing 198 wherein the low power transceiver 125, also referred to as micro link radio transceiver 125, is located. The end cap housing 198 may include a typical data connector plug (not shown) for removably coupling the cable 186 of the scanner 185 directly to the end cap housing 198. An internal continuation of the data cable 186 is routed through the end cap housing and coupled to an internal data bus of the data collection terminal 130.

The scanner 185 preferably has a pistol grip type handle 199 and a scanning head 200, having a scanning window across a front face 201 through which a bar code label 164, shown in phantom lines, attached to a shipping container 155 may be read. The data collection terminal 130 typically includes microprocessor circuits including associated memory circuits for initially processing data received by bar code scanning. The initially processed data may then be transmitted by a low power RF link 204 to the printer device 132. The printer device 132 may either store the received information for batch transfer to the host computer 111 at a later time, or may establish in accordance with the above described high power radio provisions as implemented through the boards 177 and 178 a link to the high power communication system 122, or through the modem board 179 a telephone link, to communicate the data to the host computer 111 on a real time basis.

The second housing cavity 162 forms a receptacle 162 for the data collection terminal 130. Flanged side walls 205 guide and temporarily hold the data collection terminal 130 when it is longitudinally inserted into a receptacle or socket 206 formed by the side walls 205 in combination with a closed back 207. A base end 208 of the socket 206 holds a plurality of the spaced surface contacts 175 which engage correspondingly spaced surface contacts 174 on the base end 192 of the data collection terminal 130 when the data collection terminal 130 is inserted into the socket 206 of the printer housing 159. The matching contact elements 174 and 175 couple the data collection terminal 130 to the printer both electrically and for data communication purposes. Thus, upon insertion of the data collection terminal 130 into the socket 206 a signal establishing the direct data link between the printer device 132 and the data collection terminal 130 may be used in the preferred system to log off the data collection terminal 130 from the low power communication system 123 and to reroute messages addressed to the data collection terminal 130, such as from the scanners 141 or 142 directly to the printer device 132. The printer device 132 through typical microprocessor circuitry in the control board 131 may route received scanned data messages from the scanners 141 or 142 (or more scanners if conveniently coupled into the low power LAN 123) to the data collection terminal 130 via data contacts of the coupled contacts 174 and 175, in further reference to FIGS. 3, 9 as well as 12 and 13.

Thus as shown in FIG. 11, with the data collection terminal 130 being inserted into the printer device 132 as described, data communication exists directly between the linear measuring device 148 and the printer device 132. The control board 131 may cause the data collected by the linear measure 148 to be displayed on the screen of the data collection terminal 130. In a similar manner, the scales 136 communicate directly with the printer 132. The protocol may provide, however, that the data collection terminal may be used as an alternate data receiving device even when the data collection terminal 130 is temporarily disposed within the socket 206 of the printer device 132.

The arrangement of the printer device 132, and the data collection terminal 130 with an attached data scanner as shown in FIG. 12 may be preferred in a delivery route operation. The printer device 132 is then preferably disposed in the cab of the delivery vehicle or truck, and the driver or operator of the data collection terminal may carry the data collection terminal 130 in a belt holster (not shown). The operator uses the scanner 185 to verify the package or container 155 to be delivered by reading the bar code 164 on the container 155 and by verifying immediately the information on the screen 189 of the data collection terminal 130. However, only a few containers 155 may need to be selected and verified at a single stop along the delivery route, such that crying the data collection terminal 130 about for a short time is not an impediment and improves the process of verifying the correctness of the delivery. The selection of the container or containers 155 may further be improved when the operator enters delivery point information into the data collection terminal and requests the data terminal to verify the correspondence of the selected containers 155 with those to be delivered at a certain stop. When the bar code of a container 155 is read, the data collection terminal 130 compares the information on the bar code with the requested address information to verify the correctness. An audible alarm on the data collection terminal 130 may then indicate to the operator whether the information on the bar code corresponds to the desired container 155. The operator may consequently search for containers under normally insufficient lighting conditions, as may exist in the back of the delivery vehicle, without reference to the screen 189. The audible signal indicates the correctness of the selection. The verified container information is transferred by the established low power communication link 204 to the printer and a shipping receipt to be signed by the receiver of the freight delivery is printed by the printer device 132 as soon as the selection process is completed.

The embodiment of FIG. 12 may, however, not be an optimum solution when it is desired to scan an comparatively large number of labels associated with a correspondingly large number of shipping containers. The cable-attached scanner 185 is advantageously removed and replaced by a scanner, such as the scanner 141 or 142, which communicates via the low power LAN system 123. Such may be the case when an aircraft or other vehicle with a large number of shipped packages and containers arrives at an intermediate shipping point, and the packages and containers need to be identified and re-distributed and re-routed to various destinations within a critically short time span. It may be desirable at that time to operate with a plurality of scanners, and providing a system by which the operator sorting out the containers is least impeded with the weight or size of hand-held data collection terminals.

Figure 13:
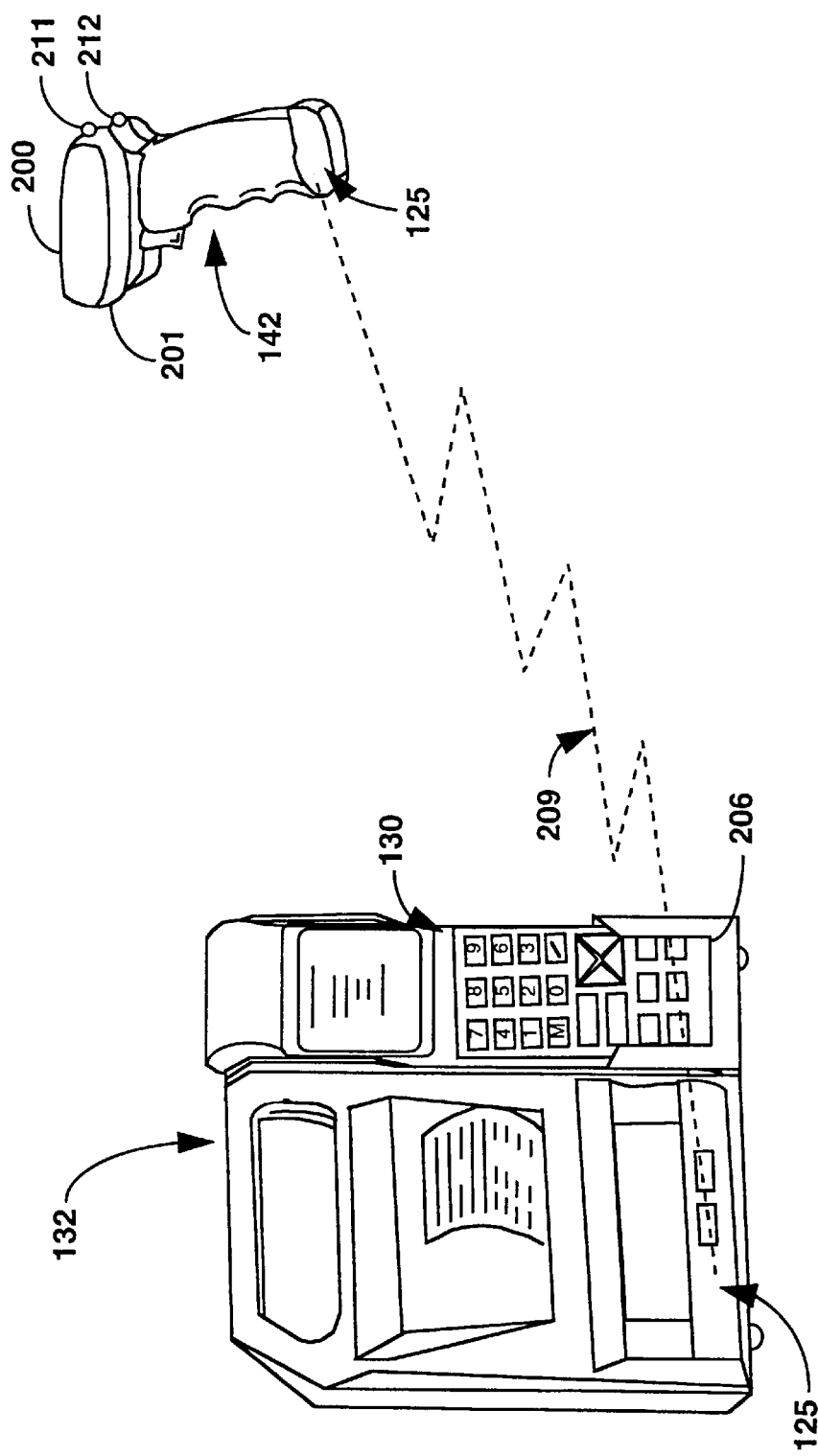
FIG. 13 is a simplified pictorial representation of a printer device, a data collection terminal and a scanner device coupled by a low power communication link.

FIG. 13 depicts a respective use of the data collection terminal 130 in combination with the printer device 132 which may be preferred at a site at which the containers 155 are sorted and re-routed, hence transferred. The data collection terminal 130 is inserted into the socket 206 of the printer device 132. A plurality of scanner devices, representatively portrayed by the single hand-held scanner 142, may be logged on to the low power communication system 123, as schematically indicated by a link 209. Each of the scanners 142 is individually identified by a designated address code and becomes interactively linked to communicate data messages to the printer device. Thus, the control board 131 of the printer device 132 (which may interact directly with the data processing circuits of the data collection terminal 130) identifies the source of each of the scanned data messages as they are received by the low power transceiver 125 in the printer device 132. Since the scanner device 142 is a data input device, communicating data messages of scanned information into the system 123, the need for an RF receiver in the scanner may not be deemed necessary. However, within the system 123 as described herein, the transceiver 125 of the scanner device 142 receives codes which may trigger it to transmit information during designated time slots, thereby permitting time slot multiplexing of the plurality of scanner devices 141 and 142 as contemplated herein. It is further desirable to communicate to each of the scanner operators information as to the result of each scan based on data stored at the data collection terminal, within the printer control board 131 or even at the host computer 111.

As is known with respect to typical hand scanners of bar codes, the scanner units may have indicator lamps which indicate when a scan has successfully identified the information of the label. An audible as well as a visual indication is given, typically by color differentiated indicator lights, such as indicator lights 211 and 212. In operation, each of the scanners 142 reads a bar code. The scanner head 200 reads the bar code data through the typical window 201. The scanned information is transmitted via the low power transceiver 125, which may be disposed conveniently at a lower end of the handle 199. A transmitted data message of raw data would be received by the corresponding receiver section of the transceiver 125 at the printer device 132. The printer device 132 causes the received data message to be interpreted and then transmits to the respective scanner a data message acknowledging the receipt of the scan and whether the data found a match with a desired category containers. The match may be indicated by an audible signal at the scanner 142 or by a light signal of a combination of the indicator lights 211 and 212, as an example. Of interest to the desired sequence of events is the return of a data message to the scanner indicating to its operator the result of the scan, the result having been arrived at a point remote from the scanner device 142 itself.

An example of an application of the described embodiment demonstrates certain advantages of the use of a plurality of the scanners, such as scanners 141 and 142, and the direct coupling of the data collection terminal 130 to the printer device 132. A shipment of a great number of packages or containers 155 is, accordingly, received at a shipping node for redistribution and further shipment by ten distinct outgoing routes, as an example. The objective at the node is to correctly direct each of the received packages 155 to one of the ten outgoing routes. Accordingly, ten scanners 142 may be linked to the printer device 132. The data terminal 130 or the control board of the printer device 132 contains all shipping information for each of the packages that should have arrived by and should be part of the received shipment. Each one of the ten scanners 142 is assigned to scan for and select packages for only one designated one of the ten outgoing routes. Thus, as the packages are sequentially advanced, such as on a conveyor (not shown) past ten distribution points corresponding to the ten outgoing routes, each operator scans the passing packages. When one of the scanned bar code labels of the passing packages indicates a match with that of the outgoing route, the operator removes the package from advancing further to the next station. Because each of the scanners 142 is individually logged into the low power communication system and can be uniquely addressed by the function of the control board 131 of the printer device 132, each of the scanners 142 is capable of functioning in the described manner to select only those packages that are destined to be routed via the predetermined outgoing route. The lack of dangling data or power cords in the vicinity of package advancing mechanisms, such as moving conveyor belts or conveyor rolls contribute to the safety of the operators, preventing accidental entanglement of the operator with the dangling data or power cords and with the moving conveyor mechanism.

In the described distribution process, one of the data collection terminals 130 may accompany each of the shipments, the shipping data may be transferred at the conclusion of the selection process to a respective one of the data collection terminals 130 to accompany the newly assembled shipment to the next distribution point or delivery route truck for individual distribution. The data collected may also be transferred either in the referred to batch process or by real time transmission from the printer device 132 to the host computer 111 for billing and bookkeeping purposes.

Summarizing the described improvements and advantageous procedures, packages or containers 155 may be collected, shipped, redistributed and delivered in accordance herewith by measuring and weighing the containers 155 as described with respect to FIG. 11. Weight and size measurement data are transferred by the described low power micro link radio of the data communication system 123 to a printer device 132. The printer device 132 may transfer the received measurement data to the data collection terminal 130 with is temporarily inserted into a socket 206 of the printer device 132. The printer device 132 at that time also prints bar code labels which the route driver or operator attaches to the respective containers 155. The containers are then picked up by a route vehicle and the information regarding the accepted containers 155 is transmitted by batch transfer or on a real time basis in accordance herewith to the central host computer 111. The host computer may redistribute the shipping information by telephone communication links to respective redistribution points along the intended shipping route of each of the containers. In this manner each of the distribution nodes receives advance information as to the size, number and weight of packages in incoming shipments and in outgoing shipments after redistribution.

Advance notice as to the volume and total weight to be transported along a certain route permits the allocation of personnel or equipment to serve the need, should there be a variance from a certain normal volume or weight. Data collection terminals 130 may be logged on together with more than one printer device 132 according to needs at the referred to distribution nodes to process the incoming shipments as described above.

Because of the short effective range of the low power data communication system 123, the low power data system is well suited for route delivery and pickup operations, since a comparatively large number of individual operators can simultaneously cover various adjacent zones of a city or similar adjacent delivery areas without receiving interference from each others operations. The low power communication system 123 has been described particularly with respect to an RF communication system. Such low power systems may operate for example in a CB band frequency or in frequency bands allocated to transmission systems for garage door openers. An example of an operating band may be the 27 MHz band. It is, of course, within the scope of the invention that low power or short range signals other than RF transmissions be used. Infra red light transmission may, for example, be a substitute for low power RF communications.

Obviously many modifications and variations of the present invention are possible in light of the above teachings. It is therefore to be understood that, within the scope of the appended claims, the invention may be practiced otherwise than as specifically described.

We claim:

1. A data communication system comprising:

A plurality of remote data systems comprising a portable terminal, a code reader, and a printer, at least one of the portable terminal, code reader, or printer comprising a battery power source;

each of the portable terminal, code reader, and printer having a wireless transceiver for communication at a lower power transmission;

a local wireless transceiver;

a local computer system communicatively coupled to the local wireless transceiver and communication occurs between the host computer system and the one of the portable terminal, code reader, or printer of each of the plurality of remote data systems via higher power transmissions through the local wireless transceiver.

2. The data communication system of claim 1 wherein the printer further comprises a dock for communicatively receiving the portable terminal.

3. The data communication system of claim 1 wherein the host computer system comprises a dock for communicatively receiving the portable terminal.

4. The data communication system of claim 1 wherein the printer includes an input to utilizing a vehicle power source.

5. The data communication system of claim 4 wherein the releasable input connects to a cigarette lighter in a vehicle.

6. In a data communication system, a mobile data collection system comprising:

a portable terminal comprising a power source and a radio for transmitting and receiving information at a lower power;

a code reader communicatively coupled to the portable terminal;

a printer that wirelessly transmits information to and receives information from the portable terminal at the lower power, and transmits and receives information at a higher power outside of the mobile data collection system; and a dock that engagingly receives the portable terminal to provide a communication link to the portable terminal.

7. The system of claim 6 wherein the printer further comprises the dock.

8. The data communication system of claim 6 wherein the printer includes an input to utilize a vehicle power source.

9. The data communication system of claim 8 wherein the input connects to a cigarette lighter in a vehicle.

10. A data communication system comprising:

a mobile collection system comprising, a first data device, a second data device, and a third data device, at least two of the first data device, the second data device, or the third data device communicatively coupled via a radio transmitting at a lower power, and at least one of the first data device, the second data device, or the third data device comprises a radio transmitting at a higher power outside the mobile collection system, the first data device, the second data device, and the third data device comprising a portable terminal, a code reader, and a printer;

a local computer system communicatively coupled the radio transmitting at a higher power.

11. The data communication system of claim 10, the printer further comprising an engagement mechanism for communicatively mating the portable terminal to the printer.

12. The data communication system of claim 10, the printer further including an input to utilize a vehicle power source.

13. The data communication system of claim 12 wherein the input connects to a cigarette lighter in a vehicle.

* * * * *